United States Patent Office 3,439,183
Patented Apr. 15, 1969

3,439,183
SOLID STATE FENCE CONTROLLER
Leonard L. Hurst, Jr., Albert Lea, Minn., assignor to International Electric Fence Co., Inc., Albert Lea, Minn., a corporation of Washington
Filed Mar. 16, 1966, Ser. No. 534,787
Int. Cl. H01h 47/18
U.S. Cl. 307—132                    6 Claims

ABSTRACT OF THE DISCLOSURE

A solid state fence charger which has a bidirectional switching means in the input circuit and which has a control circuit for the bidirectional switching means which is in parallel with the input circuit and has an RC charging circuit and unidirectional element and which is discharged through a second unidirectional element which provides a gating circuit for the bidirectional switch. This circuit provides a safety feature in that the main switch will not be energized upon an electrical failure and thus the output circuit will be de-energized.

---

Figure 1:
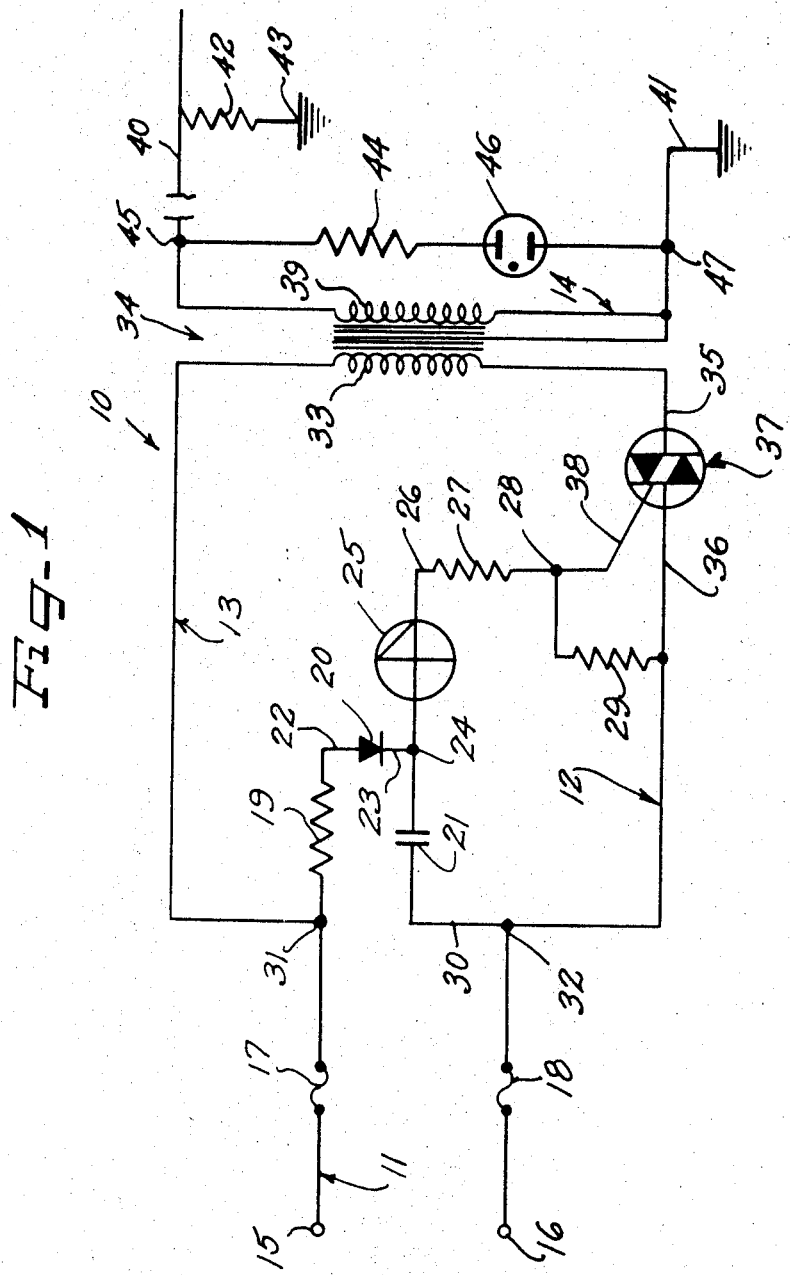

This invention relates to a solid state fence controller and in particular relates to a fence charging network having an improved safety circuit and an increased efficiency for applying an energy signal to an associated electrical fence.

Fence chargers currently in use generally employ various mechanical devices for developing discrete energy pulses and for applying those pulses to an associated electrical fence. It has been found, however, that such devices are subject to wear after repeated use and subject to deterioration due to adverse weather conditions. Accordingly, electronic fence charging networks have been developed which may be encapsulated in an epoxy resin or the like. Such encapsulation of the network makes the fence charging device more capable of withstanding shock and humidity which could otherwise interfere with the control functions of the circuit.

Mechanically operated fence chargers, however, have had an advantage of being able to employ various devices which can assure that a high energy charge is not applied continuously to the associated fence. For instance, mechanical relay devices have been employed to hold the principal charging circuit in an opened condition in response to an electrical failure or the like. In contrast, electronic or solid state fence charging networks heretofore known have not incorporated safety features which are entirely satisfactory.

In addition, solid state fence charging networks heretofore known in the art have utilized a capacitor which is discharged through an electronic switch and which discharge is utilized directly for applying energy to the associated fence. Such a discharge, however, tends to place a high energy pulse on the electrical fence which in certain applications may be undesirable. Also, utilizing the capacitor discharge directly as a means for energizing the associated fence has meant that the main charging circuit has been capable of utilizing only a D-C energizing signal.

Accordingly, it is a principal object of this invention to provide a solid state fence controller having an improved means for applying an energy signal to an associated electrical fence.

It is also an object of this invention to provide a fence charging network having a time control capacitor which discharges entirely separately from the main charging circuit.

It is another object of this invention to provide a charging network for an electrical fence having unidirectional means for charging a time control capacitor and having bi-directional means for energizing a main charging circuit, wherein the time control capacitor is used to control the functioning of the bi-directional energizing means.

It is a further object of this invention to provide a fence charging network having a triac for controlling a bi-directional current through a main charging circuit and having a triac gate which is controlled by a four-layer diode which in turn is energized by a time control capacitor.

It is an additional object of this invention to provide a fence charging network wherein the main charging circuit is energized by a bi-directional charging means and wherein the main charging circuit is controlled by a bi-directional switch comprising the combination of a four-way rectifier and a silicon controlled diode.

It is another object of this invention to provide a fence charging network utilizing a four-layer diode for controlling the energization of a fence charging means wherein short-circuiting of the diode results in a fail-safe condition for cutting off the application of electrical energy to the associated electrical fence.

These and other objects, features and advantages of the present invention will be understood from the following description and the associated drawings wherein reference numerals are utilized to designate illustrative embodiments.

Figure 2:
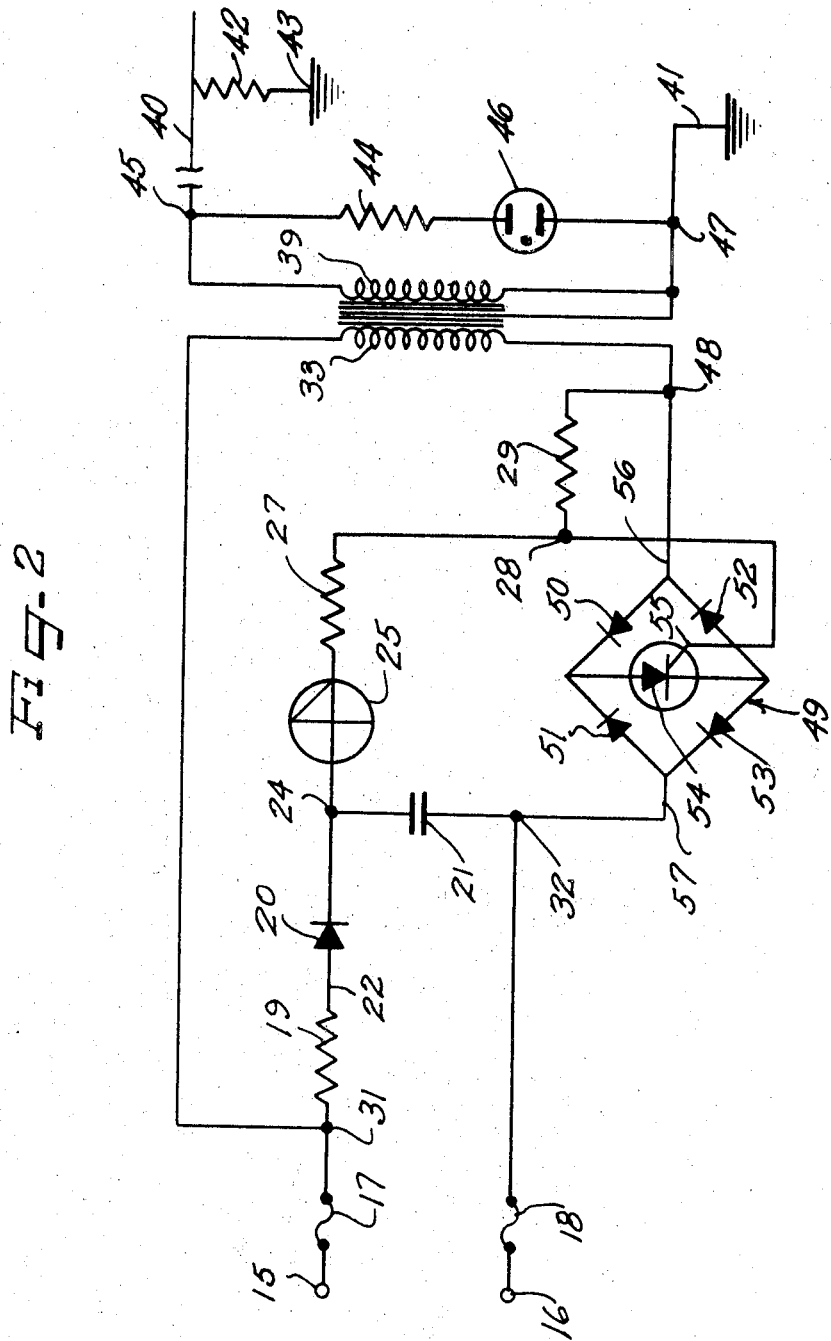

On the drawings:

FIGURE 1 is a schematic diagram of a fence charging network having a triac as a bi-directional switching means for controlling the charging of a main charging circuit; and FIGURE 2 is a schematic diagram similar to the diagram of FIGURE 1 showing an alternate means for controlling the bi-directional signal within the main charging network.

As shown on the drawings:

The features of this invention are adaptable to an electrical network 10 as shown in FIGURE 1. Generally the network 10 comprises a feed circuit 11, a control circuit 12, an input circuit 13 and an output circuit 14. The feed circuit 11 is utilized to convert a standard A-C signal into a unidirectional current for charging a time control capacitor and also for energizing the input circuit 13. The control circut 12 is separated from the input circuit 13 and utilizes an electronic switching means for simultaneously controlling the flow of current through the input circuit 13 and for discharging the time control capacitor which is associated with both the feed circuit 11 and the control circuit 12. Finally, the output circuit 14 utilizes energy developed at the input circuit 13 for applying an electrical signal to an associated fence.

The feed circuit 11 is provided with first and second feed terminals 15 and 16 which may be connected across a standard A-C electrical source such as a 120 volt, 60 cycle signal. Fuses 17 and 18 are connected directly to the terminals 15 and 16 and are used to break electrical contact with the main charging circuit in the event of an overload as is well understood. The input circuit 11 is completed by three circuit elements, namely, a limiting resistor 19, a diode 20 and a capacitance means or time control capacitor 21. The resistor 19 limits the value of current within the feed circuit 11 and is the principal means for limiting the charge developed at the capacitor 21. The diode 20 has an emitter terminal 22 connected directly to the resistor 19 and a collector terminal 23 connected to a circuit junction point 24. The time control capacitor 21 is then series connected between the junction point 24 and the fuse 18.

The time control capacitor 21 as connected between the junction point 24 and the fuse 18 is a common circuit element with the control circuit 12, and hence the control circuit 12 may be utilized as a means for discharging the capacitor 21 as well as supplying a control signal for regulating current through the input circuit 13.

The control circuit 12 employs an electronic switching means or a four-layer diode 25 which is connected from the junction point 24 associated with the feed circuit 11 to a first terminal 26 of a resistor 27. The resistor 27 is connected to a circuit junction point 28 which may be identified as a control terminal or gating means for the bi-directional switching means of the input circuit 13. The control circuit 12 is then completed through a shunt resistor 29 which is connected from the junction point 28 to a terminal 30 of the time control capacitor 21. It may be noted therefore that when the four-layer diode 25 is in a conducting state, the capacitor 21 may be discharged through the diode 25 and the resistors 27 and 29. However, when the diode 25 is in a non-conducting state, a discharge path is not available, as the diode 20 of the feed circuit 11 prevents the discharge of the capacitor 21.

The input circuit 13 is connected directly from junction points 31 and 32 adjacent the fuses 17 and 18 of the feed circuit 11. Therefore, the diode 20 which is necessary to enable charging of the time control capacitor 21 is not connected within the input circuit 13. Accordingly the energizing signal of the circuit 13 will be the A-C signal as applied to the terminals 15 and 16 of the feed circuit 11.

The input circuit 13 is completed by two circuit elements, namely, a primary winding 33 of an energizing means or a coupling transformer 34 which is connected in series with first and second terminals 35 and 36 of a bi-directional electronic switching means or a triac 37. The terminal 36 of the triac 37 is then connected directly to the junction point 32 for completing the input circuit 13 with the standard input terminals 15 and 16.

The term "triac" is a generic name that has been used to identify a three-electrode, A-C semi-conductor switch which is triggered into conduction by a gate signal. The region directly between terminals 35 and 36 may be visualized as a P-N-P-N switch in parallel with an N-P-N-P switch. The triac 37 has a gate terminal 38 which requires a more complex analytical description but which essentially comprises a means for controlling an A-C current between the terminals 35 and 36. When the gate 38 of the triac 37 reaches a given voltage level, the triac 37 will conduct in both directions from the terminal 35 to the terminal 36 as well as from the terminal 36 to the terminal 35 as indicated by the parallel diode symbol shown.

The input circuit 13 develops an energy signal at the primary winding 33 of the transformer 34 which is coupled to the output circuit 13 through a secondary winding 39. The winding 39 is connected directly to an electrical fence 40. Therefore, the fence 40 is maintained at a given voltage level as determined by the transfer of energy from the primary winding 33 to the secondary winding 39. The secondary winding 39 is grounded as at a point 41, and accordingly when an animal contacts the fence 40 as indicated by a resistance 42, the output circuit 14 is completed and current flows through the resistor 42 to ground as at the point 43.

A signal device is employed at the output circuit 14 in the form of a shunt resistance 44 which is connected from a junction point 45 to a glow tube 46. The tube 46 is then connected to ground as at the junction point 47 such that the tube 46 will be ignited at times when the electrical fence 40 is energized. The resistance 44 associated with the glow tube 46 is made to be sufficiently high such that when an animal, as indicated by the resistor 42, contacts the electrical fence 40, a much larger current will flow through the animal to ground as at the point 43 than through the glow tube 44.

In operation, a standard A-C signal is applied at the terminals 15 and 16 of the feed circuit 11 and is rectified through the diode 20 and hence charges the capacitor 21 continuously. Each cycle of the signal applied to the terminals 15 and 16 adds successively to the charge on the capacitor 21 until a given voltage level is reached at which the four-layer diode 25 becomes conductive. When the diode 25 is conductive, current will flow through the resistors 27 and 29 for discharging the capacitor 21 and for applying a given voltage level to the junction point 28 and hence to the gate 38 of the triac 37.

It may be noted that the charging of the capacitor 21 is accomplished through the use of a half-wave rectified A-C signal, while a full-wave unrectified A-C signal is applied to the input circuit 13 at the terminals 31 and 32. Accordingly full-wave energy is available for being applied to the electrical fence 40, while only a half-wave signal may be used to charge the time control capacitor 21.

Also, it may be noted that should the four-layer diode 25 fail to perform properly, the gate 38 of the triac 37 will not reach the needed potential for placing the triac 37 in a conducting state. This is because short-circuiting the four-layer diode 25, for instance, will cause the capacitor 21 to discharge through the resistors 27 and 29 as rapidly as it is charged through the diode 20, and hence, the voltage on the capacitor 21 will not increase as is required to actuate the triac 37.

When the four-layer diode 25 is placed in a conducting state, due to the voltage developed at the capacitor 21, the signal applied to the gate terminal 38 is sufficient to place the triac 37 in a conducting condition. Accordingly, the A-C signal applied to the input circuit 13 at the terminals 31 and 32 develops an A-C current through the primary winding 33 of the coupling transformer 34. The A-C signal developed within the winding 33 is then transferred to the secondary winding 39 for being applied to the electrical fence 40. The transformer 34 may have a winding turns ratio of approximately 60:1 with the larger number of turns being provided in the secondary winding 39 for stepping up the voltage applied to the primary 33.

The capacitor 21 does not discharge through the primary winding 33 due to the positioning of the diode 20, and due to the connection of the input circuit at the terminals 31 and 32. Accordingly, the signal applied to the primary winding 33 will be approximately a 120-volt, 60-cycle signal. The duration of the signal at the winding 33 will be determined by the time constant as provided by the capacitor 21 and the resistors 27 and 29. By adjusting the values of the resistors 27 and 29, a longer time constant may be available for increasing the duration of the signal applied to the primary winding 33. Also, by increasing the value of the capacitance 21, the time required to develop a voltage level for triggering the triac 37 may be increased.

An alternate form of the fence charging circuit of this invention is shown in FIGURE 2 and, as many of the features of FIGURE 2 are similar to the features of FIGURE 1, reference numerals have been carried forward to that figure.

In FIGURE 2, the resistor 29 is connected from the junction point 28 to a junction point 48 such that the discharge of the capacitor 21 will be carried through a bi-directional electronic switching means 49. The switching means 49 includes four diodes 50, 51, 52 and 53, and a SCR (silicon control rectifier) 54. The diodes 50–53 are connected as a full wave rectifier, and the SCR 54 is connected across the diodes such that current flow in either direction passes unidirectionally through the SCR. The SCR 54 has a gate terminal 55 which is connected directly to the junction point 28. The bi-directional switch 49 has first and second terminals 56 and 57 connected respectively from the junction point 48 to the junction point 32.

When the voltage at the junction point 28 reaches a predetermined level as determined by the charging of the capacitor 21 and by the operaton of the four-layer diode 25, the silicon control rectifier 54 will be placed in a conducting state. Accordingly, a positive portion of the standard A-C signal, as applied at the terminal 56, will conduct through the diode 50, the silicon control rectifier 54 and the diode 53 to the terminal 57. Likewise, during negative portions of the standard A-C signal, conduction will occur from the terminal 57 through the diode 51, the silicon control rectifier 54, and the diode 52 to the terminal 56. Therefore, the bi-directional switching means 49 applies an A-C signal to the primary winding 33 in response to the control signal applied at the junction point 28. Therefore, the cited advantages associated with the fence charging network of FIGURE 1 may be obtained through the alternate embodiment of FIGURE 2.

It will be understood that various modifications and combinations of the features of this invention may be achieved by those versed in the art, but I desire to claim all such modifications and combinations as properly come within the scope and spirit of my invention.

I claim as my invention:

1. An electronic fence charger comprising:
an input circuit with input terminals,
an output circuit coupled to said input circuit,
a bidirectional switch with a gate connected in circuit with said input circuit,
a control circuit connected across said input terminals and comprising a first resistor, a first diode, and a capacitor in series across the input terminals,
a second diode and second and third resistors connected in series between one input terminal and the junction point between the first diode and the capacitor, and
the junction point between the second and third resistors connected to the gate of the bidirectional switch.

2. An electronic fence charger according to claim 1 wherein said bidirectional switch is a triac.

3. An electronic fence charger according to claim 1 wherein said second diode is a four-layer diode.

4. An electronic switch according to claim 1 wherein the input and output circuits are coupled together through a transformer.

5. An electronic fence charger comprising:
an input circuit with input terminals,
a transformer with its primary connected in the input circuit,
an output circuit connected in circuit with the secondary of the transformer,
a triac with a gate electrode connected in the input circuit,
a control circuit connected across the input terminals and comprising a first resistor,
a first diode and a capacitor in series across the input terminals,
a four-layer diode and a second resistor connected between the gate electrode and junction between the capacitor and the first diode, and
a third resistor connected from an input terminal to the gate electrode.

6. An electronic fence charger comprising:
an input circuit with input terminals,
a transformer with its primary connected in the input circuit,
an output circuit connected in circuit with the secondary of the transformer,
a rectifier bridge connected in the input circuit,
a silicon controlled rectifier with a gate electrode connected across said bridge,
a control circuit comprising a first resistor,
a first diode and capacitor in series across the input terminals,
a four-layer diode and a second resistor connected between the gate electrode and the junction between the capacitor and the first diode, and
a third resistor connected from the gate electrode to the input circuit.

References Cited

UNITED STATES PATENTS

| | | | |
|---|---|---|---|
| 3,201,597 | 8/1965 | Balan | 307—252 |
| 3,259,893 | 7/1966 | Parker | 307—252 X |
| 3,302,128 | 1/1967 | Schoemehl et al. | 331—111 X |
| 3,325,717 | 6/1967 | Nellis | 307—132 |
| 3,348,131 | 10/1967 | Banks. | |

FOREIGN PATENTS

| | | |
|---|---|---|
| 945,249 | 12/1963 | Great Britain. |
| 1,267,417 | 6/1961 | France. |

ROBERT K. SCHAEFER, *Primary Examiner.*

T. B. JOIKE, *Assistant Examiner.*

U.S. Cl. X.R.

307—252